United States Patent
Patat et al.

(10) Patent No.: US 9,316,153 B2
(45) Date of Patent: Apr. 19, 2016

(54) PURGE AND COOLING AIR FOR AN EXHAUST SECTION OF A GAS TURBINE ASSEMBLY

(71) Applicants: Harry Patat, Hobe Sound, FL (US); Cheryl A. Schopf, Jupiter, FL (US); Jerome H. Katy, Palm Beach Gardens, FL (US); Adam Wallace, Jupiter, FL (US); David J. Wiebe, Orlando, FL (US)

(72) Inventors: Harry Patat, Hobe Sound, FL (US); Cheryl A. Schopf, Jupiter, FL (US); Jerome H. Katy, Palm Beach Gardens, FL (US); Adam Wallace, Jupiter, FL (US); David J. Wiebe, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 651 days.

(21) Appl. No.: 13/746,486

(22) Filed: Jan. 22, 2013

(65) Prior Publication Data

US 2014/0205447 A1 Jul. 24, 2014

(51) Int. Cl.
| | |
|---|---|
| F01D 25/12 | (2006.01) |
| F01D 9/02 | (2006.01) |
| F01D 9/06 | (2006.01) |
| F01D 25/16 | (2006.01) |
| F01D 25/30 | (2006.01) |
| F02C 6/08 | (2006.01) |
| F02C 7/18 | (2006.01) |

(52) U.S. Cl.
CPC ... *F02C 7/18* (2013.01); *F01D 9/02* (2013.01); *F01D 9/065* (2013.01); *F01D 25/12* (2013.01); *F01D 25/125* (2013.01); *F01D 25/162* (2013.01); *F01D 25/30* (2013.01); *F02C 6/08* (2013.01); *F05D 2240/15* (2013.01)

(58) Field of Classification Search
CPC ............ F01D 1/02; F01D 1/023; F01D 1/04; F01D 25/12; F01D 25/125; F01D 25/162; F01D 25/30
See application file for complete search history.

(56) References Cited

U.S. PATENT DOCUMENTS

| | | | |
|---|---|---|---|
| 4,561,246 A | 12/1985 | Hovan | |
| 4,979,872 A | 12/1990 | Myers et al. | |
| 4,987,736 A | 1/1991 | Ciokajlo et al. | |
| 4,989,406 A | 2/1991 | Vdoviak et al. | |
| 5,292,227 A | 3/1994 | Czachor et al. | |
| 5,312,227 A | 5/1994 | Grateau et al. | |
| 5,609,467 A | 3/1997 | Lenhart et al. | |
| 7,383,686 B2 | 6/2008 | Aycock et al. | |
| 8,292,580 B2 * | 10/2012 | Schiavo | F01D 5/189 416/229 A |
| 8,371,127 B2 * | 2/2013 | Durocher | F01D 5/082 415/115 |
| 8,500,392 B2 * | 8/2013 | Durocher | F01D 9/06 415/116 |

(Continued)

FOREIGN PATENT DOCUMENTS

| | | |
|---|---|---|
| CN | 1495341 A | 5/2004 |
| CN | 101008351 A | 8/2007 |

(Continued)

*Primary Examiner* — Igor Kershteyn
*Assistant Examiner* — Christopher R Legendre

(57) ABSTRACT

A turbine exhaust casing having an outer casing, an inner casing, an annular exhaust gas path defined between outer and inner flow path walls, and a turbine exhaust casing cavity located radially outward and radially inward from the gas path. A plurality of structural struts support the inner casing to the outer casing, and a fairing surrounds each of the struts in an area extending between the outer and inner flow path walls. A first purge air path extends through at least one of the struts for conducting purge cooling air radially inward to the inner casing, and a second purge air path extends through the strut for further conducting the purge cooling air radially outward to provide a flow of purge air to a location of the exhaust casing cavity radially outward from the outer flow path wall.

20 Claims, 5 Drawing Sheets

(56) References Cited

U.S. PATENT DOCUMENTS

| | | | |
|---|---|---|---|
| 8,616,835 B2* | 12/2013 | Hashimoto | F01D 9/065 415/142 |
| 8,863,531 B2* | 10/2014 | Scott | F02C 7/18 415/115 |
| 8,979,477 B2* | 3/2015 | Johnson | F01D 9/065 415/111 |
| 2001/0047651 A1 | 12/2001 | Fukutani | |
| 2010/0303608 A1* | 12/2010 | Kataoka | F01D 25/162 415/68 |
| 2010/0307165 A1 | 12/2010 | Wong et al. | |
| 2010/0322759 A1 | 12/2010 | Tanioka | |
| 2013/0078080 A1* | 3/2013 | Durocher | F01D 25/125 415/110 |
| 2014/0205447 A1* | 7/2014 | Patat | F01D 9/065 415/177 |
| 2015/0330250 A1* | 11/2015 | Scott | F01D 9/065 415/177 |
| 2015/0337682 A1* | 11/2015 | Yeager | F02C 7/12 415/1 |

FOREIGN PATENT DOCUMENTS

| | | |
|---|---|---|
| CN | 101178014 A | 5/2008 |
| CN | 102686832 A | 9/2012 |
| EP | 0344877 A1 | 12/1989 |
| EP | 0392664 A2 | 10/1990 |
| EP | 2261468 A1 | 12/2010 |
| EP | 2497907 A2 | 9/2012 |

* cited by examiner

PURGE AND COOLING AIR FOR AN EXHAUST SECTION OF A GAS TURBINE ASSEMBLY

FIELD OF THE INVENTION

The present invention relates to a gas turbine engine and, more particularly, to cooling of components located at a gas turbine exhaust assembly of a turbine section for the engine.

BACKGROUND OF THE INVENTION

In a turbomachine, such as a gas turbine engine, air is pressurized in a compressor then mixed with fuel and burned in a combustor to generate hot combustion gases. The hot combustion gases are expanded within a turbine section including a turbine assembly where energy is extracted to power the compressor and to produce useful work, such as powering a generator to produce electricity. The hot combustion gas travels through a series of turbine stages. A turbine stage may include a row of stationary vanes followed by a row of rotating turbine blades, where the turbine blades extract energy from the hot combustion gas for powering the compressor and may provide output power. The combustion gases are exhausted through a gas path located within a turbine exhaust casing of the turbine assembly.

Components in the turbine assembly require thermal protection to maintain and extend component life, such as may be provided by cooling systems designed into and around the components and/or the use of expensive alloys that are resistant to higher temperatures. Typically, the cooling systems draw cooling air from the compressor, i.e., bleed air, which can decrease the overall efficiency of the engine.

SUMMARY OF THE INVENTION

In accordance with an aspect of the invention, a turbine assembly in a turbine engine is provided, the turbine assembly having an outer casing, an inner casing, an annular exhaust gas path defined between outer and inner flow path walls, and a turbine exhaust casing cavity located radially outward and radially inward from the gas path. The turbine assembly further comprises a plurality of structural struts supporting the inner casing to the outer casing. A fairing surrounds each of the struts in an area extending between the outer and inner flow path walls. A first purge air path extends radially inward through at least one of the struts conducting purge cooling air to the inner casing for supplying purge cooling air to at least one component radially inward from the inner casing. A second purge air path extends radially outward through the at least one strut for further conducting the purge cooling air radially outward from the at least one component to provide a flow of purge air to an outer location of the exhaust casing cavity radially outward from the outer flow path wall.

The first purge air path may be formed by a tubular passage extending through a central portion of the strut.

The second purge air path may be formed by an open cavity extending radially between radially outer and inner ends of the strut, and the tubular passage may extend through the open cavity.

The open cavity may be elongated in an axial direction parallel to the gas path, and strut orifices may be provided extending through axially extending sides of the strut from the open cavity to an area exterior of the strut and isolated from the exhaust gas path.

The strut orifices may be located adjacent to the radially outer end of the strut, and a strut shield may be provided surrounding an outer surface of the strut, and defining a gap therebetween, for guiding a flow of the purge air from the strut orifices radially inward along the outer surface of the strut.

The turbine assembly may further include an exit orifice at a radially inner end of the strut shield for providing a controlled flow of the purge air from the second purge air path into an inner location of the exhaust casing cavity radially inward from the inner flow path wall. The exit orifice may extend axially downstream from the open cavity within the strut adjacent to the inner casing.

The turbine assembly may further include an oil line extending through the first purge air path, the oil line extending radially inward to a bearing compartment for a rear bearing of the turbine engine.

Air exiting the first purge air path may provide seal pressure air exterior to a seal between a bearing compartment housing and a rotor shaft of the turbine engine.

A chamber may be located between the inner casing and the bearing compartment housing where the seal pressure air mixes with bleed air from a radially inner cooling air cavity of a turbine stage for the turbine engine and flows radially outward to an entry to the second purge air path at the inner casing.

A connecting purge air path may be located between the strut and the fairing, and extending between the outer and inner flow path walls, for conducting the purge air delivered to the outer location of the exhaust casing cavity from the second purge air path radially inward to an inner location of the exhaust casing cavity radially inward from the inner flow path wall.

The struts may comprise removable members attached to the outer and inner casings at detachable fastener connections.

The outer casing may define an intermediate turbine casing between a core engine turbine and a power turbine.

In accordance with another aspect of the invention, a turbine assembly in a turbine engine is provided, the turbine assembly having an outer casing, an inner casing, an annular exhaust gas path defined between outer and inner flow path walls, and a turbine exhaust casing cavity located radially outward and radially inward from the gas path. The turbine assembly further comprises a plurality of struts extending between the inner casing and the outer casing. A first purge air path extends radially inward through at least one of the struts conducting purge air to the inner casing for supplying purge air to at least one component radially inward from the inner casing. A second purge air path having an inlet located at the inner casing and extending radially outward through the at least one strut for further conducting the purge cooling air radially outward to provide a flow of purge air to an outer location of the exhaust casing cavity radially outward from the outer flow path wall.

A passage may extend axially forward in the turbine engine conducting the purge air exiting from the first purge air passage to a location adjacent a turbine stage cooling cavity, where the purge air mixes with air from the turbine stage cooling cavity, and may include a chamber conducting purge air axially rearward to an inlet to the second purge air passage.

The first purge air path may be supplied with purge air from a first supply location in a compressor section of the turbine engine, and the turbine stage cooling cavity may be supplied with cooling air from a second supply location of the compressor section different from the first supply location.

A portion of the purge air exiting the second purge air path may feed purge air to a connecting purge air path extending radially inward through a fairing surrounding the above-mentioned at least one strut.

A portion of the purge air exiting the second purge air passage may feed purge air in an axially forward direction to a location of a seal between a turbine ring segment and the outer flow path wall.

The strut may include opposing axially extending side walls, the opposing side walls defining a cavity forming the second purge air path therebetween, and may include strut orifices defined through the side walls at locations radially outward from the outer flow path wall for flow of the purge air out of the strut.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
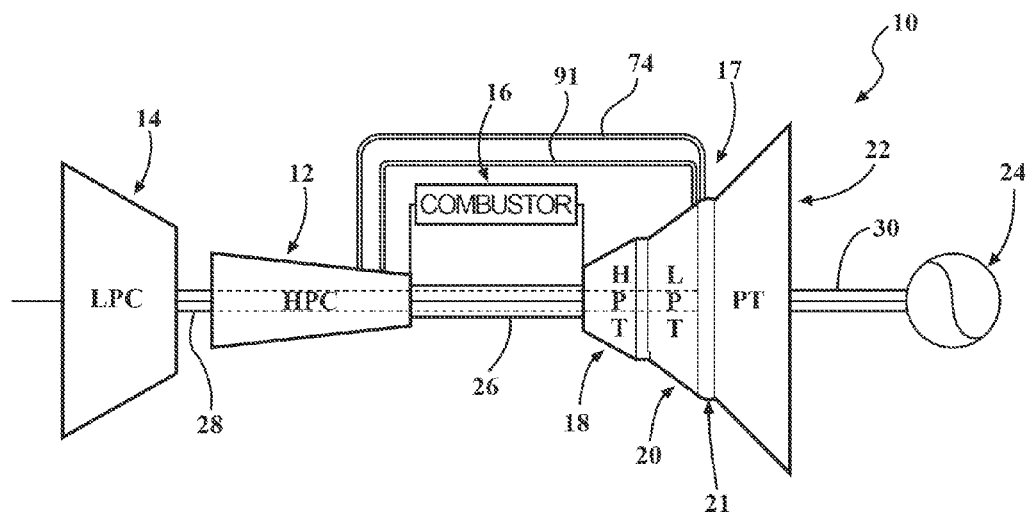
FIG. 1 is a schematic illustration of an aeroderivative industrial gas turbine engine that may incorporate aspects in accordance with the invention.
Figure 2:
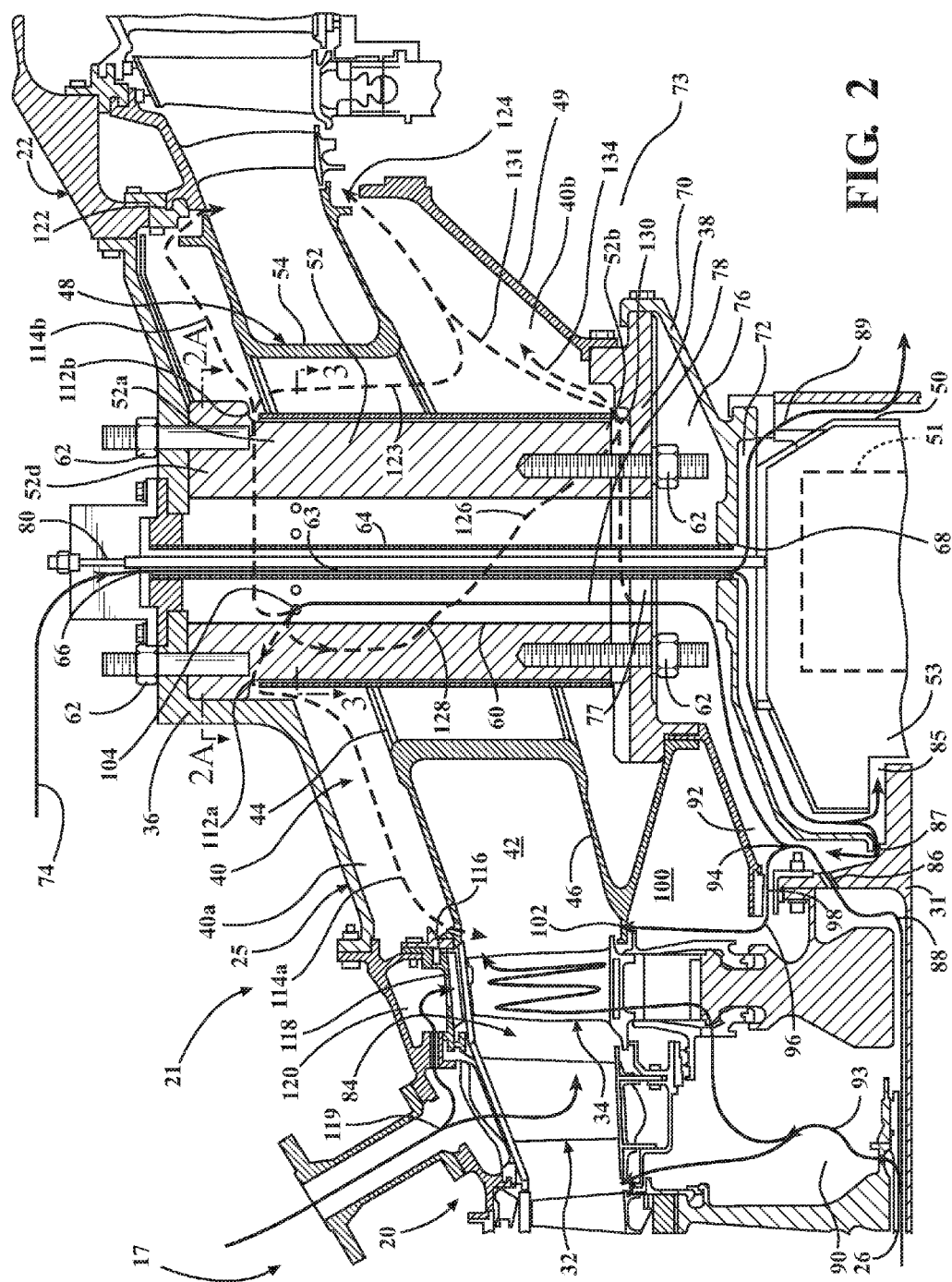
FIG. 2 is a cross-sectional view through a turbine exhaust casing section of the engine.

FIG. 1 schematically illustrates a gas turbine engine 10 that may incorporate the present invention. It should be noted that the particular engine depicted in FIG. 1 comprises an aeroderivative industrial gas turbine engine; however, this invention is not limited to the particular engine described herein. The gas turbine engine 10 comprises a high pressure compressor 12, a low pressure compressor 14, a combustor 16, a turbine section 17 including a high pressure turbine 18, a low pressure turbine 20, and a power turbine 22, and an electric generator 24. An intermediate casing 21 extends between the low pressure turbine 20 and the power turbine 22, and comprises a turbine exhaust casing 25 (FIG. 2). The high pressure compressor 12 compresses partially compressed air from the low pressure compressor exit through successive compressor stages to generate high pressure air, e.g., compressed air having a pressure of from about 4 atm to about 20 atm, and the low pressure compressor 14 compresses ambient air through successive stages to generate low pressure air, e.g., compressed air having a pressure of from about 1 atm to about 4 atm. The high and low pressure compressors 12, 14 are collectively referred to herein as "compressor apparatus".

The combustor 16 combines a portion of the compressed air from the compressor apparatus with a fuel and ignites the mixture creating combustion products defining hot working gases. The working gases travel from the combustor 16 to the turbine section 17. Within each turbine 18, 20 and 22 in the turbine section 17 are rows of stationary vanes (not shown) and rotating blades (not shown). For each row of blades, a separate disc (not shown) is provided. The discs forming part of the high pressure turbine 18 are coupled to a first rotatable shaft 26 (see FIG. 1), which is coupled to the high pressure compressor 12 to drive the high pressure compressor 12. The discs forming part of the low pressure turbine 20 are coupled to a second rotatable shaft 28 (schematically shown in FIG. 1), which is coupled to the low pressure compressor 14 to drive the low pressure compressor 14. The second rotatable shaft 28 is positioned within and is co-axial with the first rotatable shaft 26, as depicted in FIG. 1. The discs forming part of the power turbine 22 are coupled to a third rotatable shaft 30 (see FIG. 1), which is coupled to the electric generator 24 to drive the electric generator 24. As the working gases expand through the turbines 18, 20, 22, the working gases cause the rows of rotatable blades within the turbines 18, 20, 22, and therefore the corresponding discs and first, second, and third shafts 26, 28, 30 to rotate. The structure formed by the turbine discs and shafts 26, 28, 30 are generally referred to as a turbine rotor 31, see FIG. 2.

FIG. 2 illustrates the turbine exhaust casing 25 located at the outlet or exhaust of a last stage of the low pressure turbine 20, including a last stage row of vanes 32 and a last stage row of blades 34. Turbine exhaust casing 25 includes an outer ring or casing 36 and an inner ring or casing 38, defining a turbine exhaust casing cavity 40 therebetween.

An annular exhaust gas path 42 is defined between an outer flow path wall 44 and an inner flow path wall 46. The gas path 42 conducts hot gases from the low pressure turbine 20 to the power turbine 22 and divides the exhaust casing cavity into an outer casing cavity or cavity portion 40a and an inner exhaust casing cavity or cavity portion 40b. The outer exhaust casing cavity 40a is generally defined between the outer ring 36 of the exhaust casing 25 and the outer flow path wall 44, and the inner casing cavity 40b is generally defined between the inner flow path wall 46 and a cone 49 extending between a bearing housing 50 and a front or upstream end of the power turbine 22.

Figure 5:
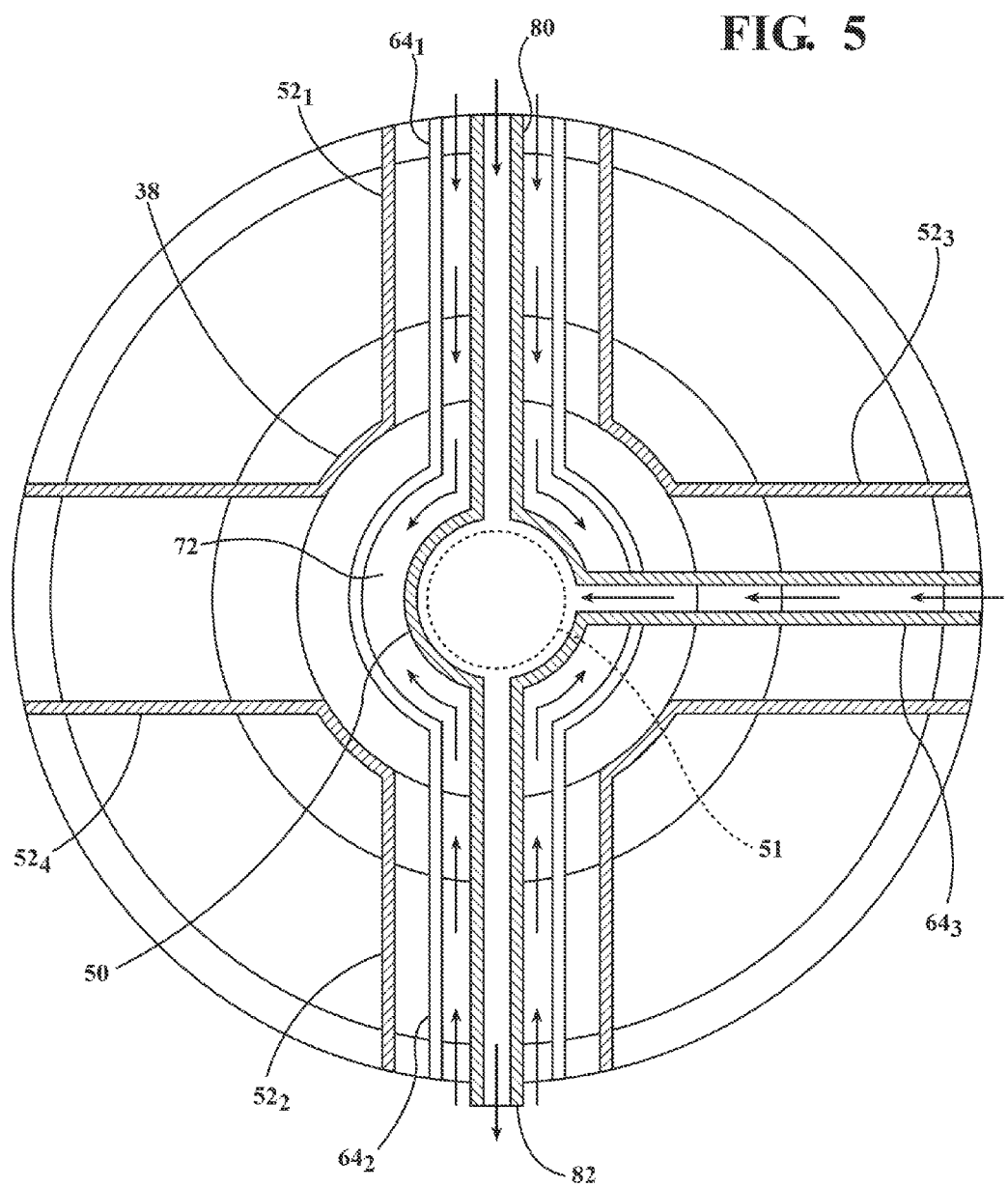
FIG. 5 is a diagrammatic cross-sectional view taken axially through a plurality of strut assemblies in the turbine exhaust casing.

Referring to FIGS. 2 and 5, a plurality of strut assemblies 48 are spaced circumferentially around the turbine exhaust casing 25, extending radially inward from the outer ring 36 to the inner ring 38 for supporting the inner ring 38. The bearing housing 50 is supported to a radially inner side of the inner ring 38 and is provided for enclosing a rear bearing, illustrated diagrammatically as 51, for supporting the turbine rotor 31. Each strut assembly 48 includes a structural strut 52, affixed to the outer and inner rings 36, 38, and a fairing 54 surrounding the strut 52 and extending between the outer and inner flow path walls 44, 46 for isolating and protecting the strut 52 from the hot gases passing through the gas path 42, see also FIG. 3.

Figure 3:
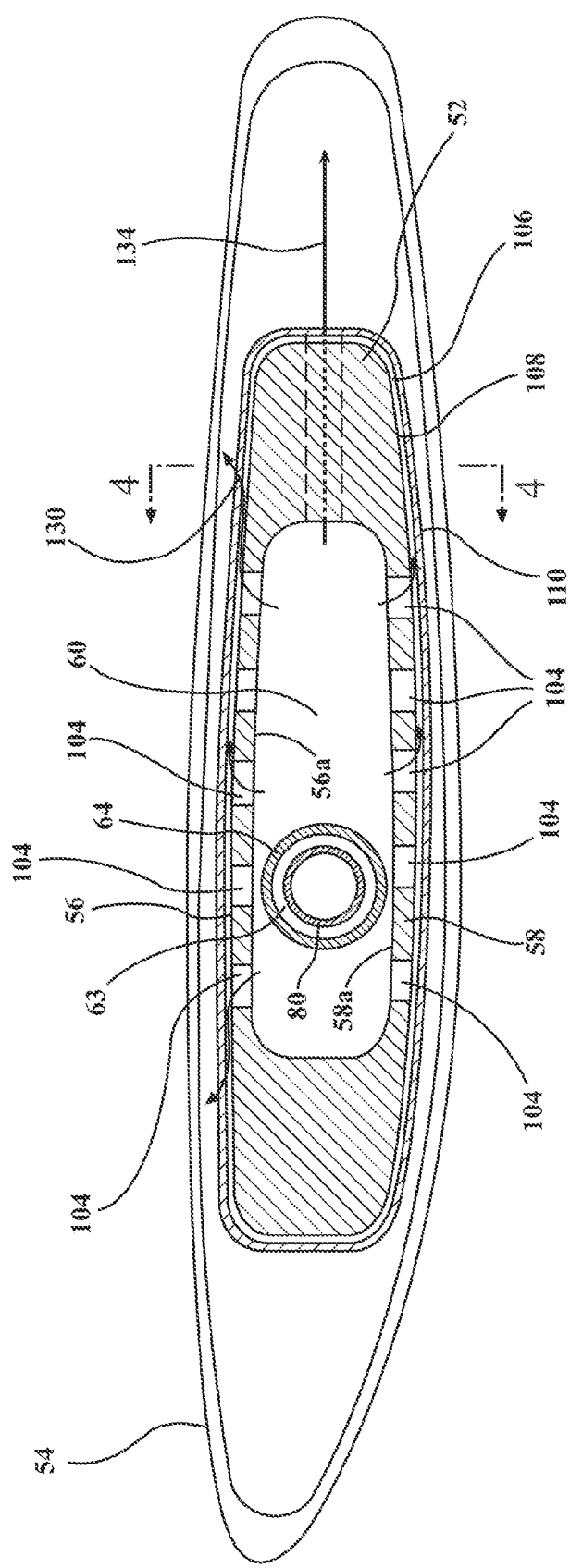
FIG. 3 is cross-sectional view taken along line 3-3 in FIG. 2.

As seen in FIG. 3, each strut 52 is elongated in the axial direction of the engine, defining axially extending outer sidewalls 56, 58 and the struts 52 are formed as generally solid structural members to provide substantial structural support for locating the inner ring 38 in the radial and circumferential directions. Further, each strut 52 is formed with an axially elongated strut cavity 60 extending radially through a central portion thereof, and defined by opposing axially elongated inner cavity walls 56a, 58a extending parallel to the outer sidewalls 56, 58.

Referring to FIG. 2, in accordance with an aspect of the invention, the struts 52 are detachably mounted, e.g., non-welded or non-integrally attached, to the outer ring 36 and inner ring 38. In the illustrated embodiment the struts 52 are abutted against the outer and inner rings 36, 38, and are attached to the outer and inner rings 36, 38 by detachable fastener connections, such as threaded bolt or stud connections 62.

Figure 2A:
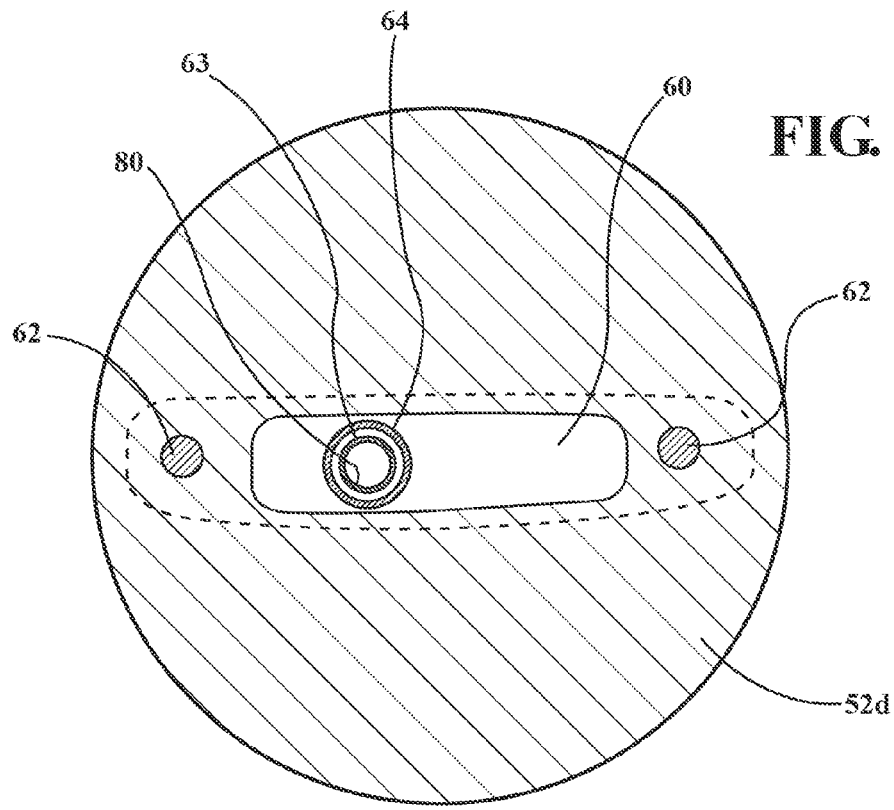
FIGS. 2A and 2B are cross-sectional views taken along line 2A-2A in FIG. 2.
Figure 2B:
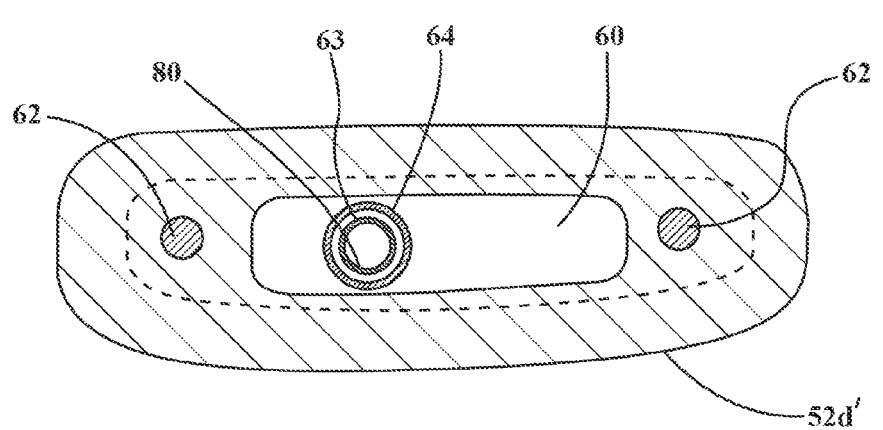

Further, as illustrated in FIGS. 2 and 2A, the struts 52 may be formed with an enlarged head portion 52d, such as a circular head portion 52d. The head portion 52d may be provided to facilitate fixation to the outer ring 36 of the casing 25. A close fit is provided between the casing and the head portion 52d, such that side loads and/or an aft load from the casing 25 will transfer to the head portion 52d, and not be carried by the bolt or stud connections 62. FIG. 2B shows an alternative configuration for a head portion 52d wherein the head portion has an oblong configuration and is designed to receive side and/or aft loads of the casing 25 in a manner similar to that discussed for the circular configuration of FIG. 2A.

Alternatively, the struts 52 may be formed without an enlarged head portion, i.e., may be formed with a straight wall or constant cross-section extending to the junction with the outer ring 36 of the casing 25. In this case, the bolt or stud connections 62 would carry the loads otherwise carried by the above-described head portions 52d, 52d'.

It may be noted that although four struts 52 are illustrated herein (FIG. 5), within the scope of the present invention, other numbers of struts 52, may be provided. For example, eight struts 52, or any other number of struts, may be provided.

Additionally, although four bolts or studs 62 are shown in FIG. 2, i.e. two at each of the radially outer and inner locations of the strut 52, only two bolts or studs may be provided wherein each bolt or stud extends radially through the entire length of the strut 52, to attach to the outer and inner rings 36, 38 at each of the radially outer and inner ends of the strut 52.

Referring to FIGS. 2 and 3, in accordance with an aspect of the invention, a secondary air system (SAS) is provided. The SAS includes a first purge air path 63 that is defined through the strut cavity 60, and may be defined by a tubular bleed air path member 64 extending from an air entry location 66 at the outer ring 36 to a radially inner location 68 on a seal wall 70 attached to the inner ring 36 and surrounding the bearing housing 50. A first inner ring chamber 72 is located radially inward from the inner ring 38 and is defined between the seal wall 70 and the bearing housing 50. A first cooling air supply line, illustrated diagrammatically at 74, provides a supply of cooling air to the air path member 64. For example, the supply of cooling air to the air path member 64 may be provided from a stage of the high pressure compressor 12, such as eighth stage bleed air from the compressor 12, see also FIG. 1. The air provided through the first cooling air supply line 74 may be cooled, such as by passing through a heat exchanger, prior to flowing into the air path member 64. It will be evident from the description below that the air provided through the air path member 64 provides a cooling air function, as well as a purge air function to pressurize certain areas within the turbine exhaust casing 25 against ingress of hot gases. For example, as will be described further below, the air path member 64 conducts cooling or purge air radially inward through the strut cavity 60 into the first inner ring chamber 72.

As seen in FIG. 2, a second inner ring chamber 76 is defined between the inner ring 38 and seal wall 70, radially outward from the first inner ring chamber 72. The strut cavity 60 is in fluid communication with the second inner ring chamber 76 via a through passage 77 provided extending through the inner ring 38. The strut cavity 60 defines a second purge air path 78 of the SAS for conducting cooling and purge air radially outward from a radially inner end 52b of the strut 52 to a radially outer end 52a of the strut 52. The second inner ring chamber 76 receives the cooling or purge air for the second purge air path 78 as mixture of air from the first purge air path 63 and from turbine disc cooling air, as will be described in greater detail below.

It may be noted that the radially outer and inner ends 52a, 52b of the struts 52 form a generally sealing engagement with the outer and inner rings 36, 38, except for predetermined purge air passages and orifices, as described herein for providing a controlled purge air flow within the turbine exhaust casing 25.

Optionally, an oil supply line 80 may be provided extending through the bleed air path member 64. The oil supply line 80 may provide oil to the bearing 51, and is protected by purge air from heat transferred to the strut assembly 48, i.e., from the hot gas flow in the gas path 42, wherein the purge air flowing in both the first and second purge air paths, 63, 78 provides a protective air barrier to the oil supply line 80. It is necessary to maintain the oil supply line 80, and the oil located therein, at a temperature that avoids or reduces the tendency for coking within the oil supply line 80, such as may particularly occur during a "trip" or "dropload" condition when the engine shuts down quickly, i.e., when the oil stops flowing through the line 80. The radial outward flow of air through the second purge air path 78 provides a thermal buffer between the strut 52 and the first purge air path 63, and associated oil supply line 80. Further, the cooling air flow through the first purge air path 63 is sized to provide an increased air flow capacity, i.e., greater than is normally required to provide a cooling flow to the oil supply line 80, with a lower flow velocity. The lower flow rate through the first purge air path 63 provides a lower Mach number through the bleed air path member 64, with an associated reduced tendency to develop flow induced vibrations.

As can be seen diagrammatically in FIG. 5, a plurality of struts $52_1$, $52_2$, $52_3$, $52_4$ are illustrated, where the strut $52_2$ may be provided with an oil return line 82 extending from the bearing housing 50 to convey oil away from the bearing 51 and out of the turbine exhaust casing 25. Additionally, a plurality of bleed air path members $64_1$, $64_2$, $64_3$ may be provided for conveying purge air to the first inner ring chamber 72.

Referring to FIG. 2, cooling or purge air passing through the first purge air path 63 enters the first inner ring chamber 72 and a portion of this air flows in an axially upstream or forward direction within the chamber 72 toward a last stage 84 of the low pressure turbine 20. A portion of the forward flowing air in the first inner ring chamber 72 provides a seal pressure to a seal 85 at the bearing housing 50. That is, the air pressure in the chamber 72 provides a seal pressure air exterior to the seal 85 at a location between the bearing housing 50 and the rotor shaft 31 to prevent oil from flowing out through the seal 85. The remaining portion of forward flowing air passes through a seal 87 adjacent to the rotor 31 from the first inner ring chamber 72 to the second inner ring chamber 76.

Additionally, a portion of the air from the first purge air path 63 flows axially downstream or rearward in the first inner ring chamber 72 to orifices 89 to provide purge/cooling air to a rearward portion of the bearing compartment at a rearward seal to prevent ingress of air and heat from the power turbine forward cavity 73 into a bearing cavity 53 including the bearing compartment.

The last stage 84 of the turbine 20 may receive bleed cooling air, such as via a conduit 91 (FIG. 1) from the high pressure compressor 12, at least a portion of which is provided to a disc cooling cavity 90. For example, a cooling air flow 93 may be provided from a ninth stage of the high pressure compressor 12, and metered to cool components in and adjacent to the last stage 84 of the turbine 20 and to provide a controlled or metered flow to the turbine exhaust casing 25. In particular, orifices 86 on the rotor shaft 31 provide a controlled bleed flow 88 of cooling air from the disc cooling cavity 90 of the last turbine stage 84 into the second inner ring chamber 76, where it mixes with the air provided by the first purge air path 63 at a location generally designated by 92 to form a mixed flow 94. A portion 96 of the mixed flow 94 passes out of the second inner ring chamber 76 through a seal 98 to provide purge air to an inner flow path wall chamber 100 for preventing hot exhaust gases from passing through a seal 102 at an interface between the last turbine stage 84 and the inner flow path wall 46.

A further portion of the mixed flow 94 flows in an axial forward direction through the second inner ring chamber 76, and through the passage 77 into the second purge air path 78. That is, the mixed flow passes into the open cavity 60 of the strut 52 and flows outwardly to the radially outer end 52a of the strut 52. Referring to FIG. 3, the radially outer end 52a of the strut 52 is formed with a plurality of low loss purge flow orifices 104 extending laterally through the sides of the strut 52, from the inner cavity walls 56a, 58a to the respective outer sidewalls 56, 58. The purge flow orifices 104 define an exit passage for the second purge air path 78, permitting flow of the mixed flow 94 out of the open cavity 60 to a location exterior of the strut 52 defined as a strut shield gap 106 between the exterior surface 108 of the strut 52 and a shield 110 surrounding the strut 52. The shield 110 extends radially between and may be attached to the outer and inner rings 36, 38.

As seen in FIG. 2, a portion of the mixed air 94 passing through the orifices 104 comprises a radially outer portion that may flow out of the strut shield gap 106 past outer edges of the shield 110. That is, small or low loss gaps, depicted by a radially outer forward gap 112a and a radially outer rearward gap 112b, may be provided between the shield 110 and the outer ring 36. A predetermined or controlled amount of purge air may flow from the forward and rearward gaps 112a, 112b to the outer casing cavity 40a. A forward flowing portion 114a of the purge air provides an increase in air pressure in the outer casing cavity 40a adjacent a rear turbine seal 116, i.e., at a downstream end of a last stage turbine ring segment 118, where the purge air portion 114a and a cooling/purge air supply 119 at a last stage turbine casing cavity 120 provide a positive purge air pressure for preventing outward passage of hot gases from the gas path 42. It may be noted that the purge/cooling air provided to the last stage turbine casing cavity 120 may be provided from a further stage of the high pressure compressor 12, such as from a twelfth stage of the compressor 12.

A rearward flowing portion 114b of the purge air provides an increase in air pressure in the outer casing cavity 40a adjacent to a forward outer seal 122 with the power turbine 22. The purge air portion 114b provides a positive purge air pressure for preventing outward passage of hot gases from the gas path 42 at the entrance to the power turbine 22. The rearward flowing portion 114b further flows radially inward between the strut shield 106 and the fairing 54, depicted by flow 123, to increase the pressure in the inner casing cavity 40b adjacent to a forward inner seal 124 with the power turbine 22 to provide a positive pressure for preventing passage of hot gases into the inner casing cavity 40b.

Referring to FIG. 2, a further portion of the mixed air 94 passing through the orifices 104 into the strut shield gap 106 (FIG. 3) comprises a radially inner portion 126, which travels radially inward along an air path 128 generally defined by the strut shield gap 106, along the radial portion of the strut shield gap 106 extending between the orifices 104 and the inner ring 38. The radially inner portion 126 of the mixed air 94 passes out of the strut shield gap 106 at a small or low loss radially inner gap(s) 130 defined between the shield 110 and the inner ring 38, as is also depicted in FIG. 3. The flow defined by the radially inner portion 126 of the mixed air 94 forms a cooling air barrier around the strut 52, and the flow passing through the radially inner gap(s) 130 provides additional purge air 131 to the inner casing cavity 40b. The flow passing through the radially inner gap(s) 130 further provides cooling to the components in and adjacent to the inner casing cavity 40b. In a preferred configuration of the invention, at least 10%, i.e., 10% or more, of the mixed air 94 passing into the strut shield gap 106 should form the radially inner portion 126 of the mixed air flow, and flow out through the gap(s) 130. In a particular configuration of the mixed air flow provided to the strut shield gap 106, about two-thirds of the mixed flow 94 may be provided to pass through the radially outer gaps 112a, 112b to form the forward and rearward flowing portions 114a, 114b, and about one-third of the mixed flow may be provided to pass radially inward through the strut gap 106 to the radially inner gap(s) 130.

Figure 4:
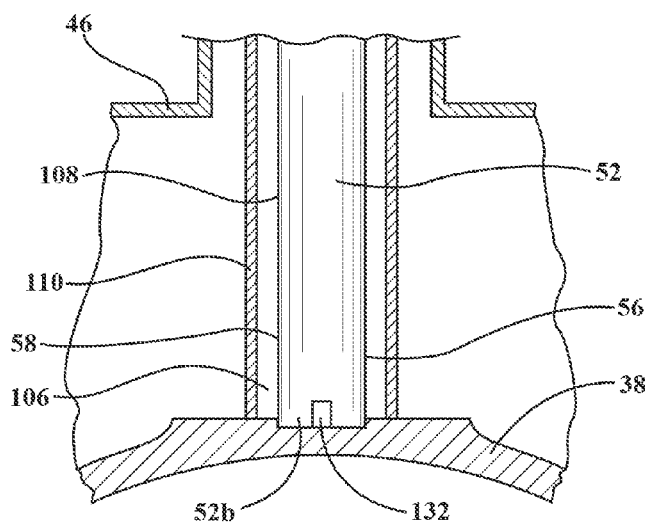
FIG. 4 is a cross-sectional view taken along line 4-4 in FIG. 3.

Also, as seen in FIGS. 2, 3 and 4, a portion of the mixed air 94 is metered directly from the open cavity 60 through an orifice 132, extending axially downstream from the open cavity 60 at the radially inner end 52b of the strut 52 adjacent to the inner ring 38. It should be understood that the orifice 132 may be formed in the inner ring 38 or the strut 52. The flow of mixed air 94 through the orifice 132 provides an additional purge air flow 134 (FIGS. 2 and 3) to the inner casing cavity 40b that may mix with the purge air flow 131 passing through the radially inner gap(s) 130 for maintaining a positive pressure at the forward inner seal 124 of the power turbine 22 and for providing cooling to the turbine exhaust casing components.

The above described secondary air system cooling configuration provides several heat transfer mechanisms for maintaining the temperature of the turbine exhaust casing components within temperature limitations of the metal forming the components and for maintaining a temperature balance between the turbine casing components. In accordance with one aspect the invention, the described SAS provides purge air, creating a positive pressure that prevents leakage of the hot gases from the gas path 42, such as may be required during baseline operation of the engine 10. In particular, the purge air prevents or limits leakage of the hot gases at the seals associated with the outer and inner flow path walls 44, 46 within the turbine exhaust casing 25.

In accordance with another aspect, the SAS provides for cooling heat transfer of components with the turbine exhaust casing 25. In particular, interior and exterior surfaces of the struts 52 are provided with a cooling air flow, i.e., passing along the open cavity surfaces and along the exterior surface 108. Further, the mixed air 94 exiting the gaps 112a, 112b and 130 at the radially outer and inner edges of the shield 110 provide cooling and a heat absorption capacitance within the turbine exhaust casing cavity 40 where the mixed air 94 cools the surfaces forming the area of the casing cavity 40 by free convection. For example, the mixed air 94 within the cavity 40 may convectively flow between the shield 106 and the fairing 54 along a radially extending connecting purge air path, connecting the outer and inner cavity portions 40a, 40b to cool the fairing 54 and permit distribution of the purge air within turbine exhaust casing cavity.

In accordance with a further aspect, the SAS provides a heat absorption capacity for maintaining the air temperature within the turbine exhaust casing cavity 40 at a level below that which could otherwise cause distress to alloy components within the turbine exhaust casing 25. In particular, the present SAS permits the turbine exhaust casing components to be constructed with lower cost, low temperature alloys by providing adequate cooling and heat absorption within the turbine exhaust casing cavity 40.

The present SAS further facilitates maintaining a temperature balance between radially outer and radially inner components during changes in engine operation. Specifically, the flow of air radially inward and outward, in the manner described herein, provides a distribution of temperature within the turbine exhaust casing 25 for maintaining a temperature balance between components during transient conditions.

Additionally, as noted above with reference to the oil supply line 80, the plural air paths in the present SAS provide a thermal barrier in the event of a condition occurring resulting in the engine shutting down quickly. The oil supply line 80 is surrounded by plural layers formed by air barriers that provide heat absorption capacity for slowing the effects of "heat soak" from hotter components. Also, the plural air chambers formed by the first and second inner ring chambers 74, 76 provide heat absorption capacity around the bearing housing 50 for slowing the effects of "heat soak" to the bearing and oil located within the bearing housing 50.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine assembly in a turbine engine, the turbine assembly having an outer casing, an inner casing, an annular exhaust gas path defined between outer and inner flow path walls, and a turbine exhaust casing cavity located radially outward and radially inward from the gas path, and further comprising:
    a plurality of structural struts supporting the inner casing to the outer casing;
    a fairing surrounding each of the struts in an area extending between the outer and inner flow path walls;
    a first purge air path extending radially inward through at least one of the struts conducting purge cooling air to the inner casing for supplying purge air to at least one component radially inward from the inner casing; and
    a second purge air path extending radially outward through the at least one of the struts for further conducting the purge cooling air radially outward from the at least one component to provide a flow of purge air to an outer location of the exhaust casing cavity radially outward from the outer flow path wall.

2. The turbine assembly of claim 1, wherein the first purge air path is formed by a tubular passage extending through a central portion of the at least one of the struts.

3. The turbine assembly of claim 2, wherein the second purge air path is formed by an open cavity extending radially between radially outer and inner ends of the at least one of the struts, and the tubular passage extends through the open cavity.

4. The turbine assembly of claim 3, wherein the open cavity is elongated in an axial direction parallel to the gas path, and including strut orifices extending through axially extending sides of the at least one of the struts from the open cavity to an area exterior of the strut and isolated from the exhaust gas path.

5. The turbine assembly of claim 4, wherein the strut orifices are located adjacent to the radially outer end of the at least one of the struts, and including a strut shield surrounding an outer surface of the at least one of the struts, and defining a gap therebetween, for guiding a flow of the purge air from the strut orifices radially inward along the outer surface of the at least one of the struts.

6. The turbine assembly of claim 5, including an exit orifice at a radially inner end of the strut shield for providing a controlled flow of the purge air from the second purge air path into an inner location of the exhaust casing cavity radially inward from the inner flow path wall.

7. The turbine assembly of claim 6, wherein the exit orifice extends axially downstream from the open cavity within the at least one of the struts adjacent to the inner casing.

8. The turbine assembly of claim 3, including an oil line extending through the first purge air path, the oil line extending radially inward to a bearing compartment for a rear bearing of the turbine engine.

9. The turbine assembly of claim 1, wherein air exiting the first purge air path provides seal pressure air exterior to a seal between a bearing compartment housing and a rotor shaft of the turbine engine.

10. The turbine assembly of claim 9, including a chamber located between the inner casing and the bearing compartment housing where the seal pressure air mixes with bleed air from a radially inner cooling air cavity of a turbine stage for the turbine engine and flows radially outward to an entry to the second purge air path at the inner casing.

11. The turbine assembly of claim 1, including a connecting purge air path located between the at least one of the struts and the fairing, and extending between the outer and inner flow path walls, for conducting the purge air delivered to the outer location of the exhaust casing cavity from the second purge air path radially inward to an inner location of the exhaust casing cavity radially inward from the inner flow path wall.

12. The turbine assembly of claim 1, wherein the struts are removable members attached to the outer and inner casings at detachable fastener connections.

13. The turbine assembly of claim 1, wherein the outer casing defines an intermediate turbine casing between a core engine turbine and a power turbine.

14. A turbine assembly in a turbine engine, the turbine assembly having an outer casing, an inner casing, an annular exhaust gas path defined between outer and inner flow path walls, and a turbine exhaust casing cavity located radially outward and radially inward from the gas path, and further comprising:
    a plurality of struts extending between the inner casing and the outer casing;
    a first purge air path extending radially inward through at least one of the struts conducting purge air to the inner casing for supplying purge air to at least one component radially inward from the inner casing; and
    a second purge air path having an inlet located at the inner casing and extending radially outward through the at least one of the struts for further conducting the purge cooling air radially outward to provide a flow of purge air to an outer location of the exhaust casing cavity radially outward from the outer flow path wall;

wherein the at least one of the struts includes opposing axially extending side walls, the opposing side walls defining a cavity forming the second purge air path therebetween, and including strut orifices defined through the side walls for flow of the purge air out of the at least one of the struts.

15. The turbine assembly of claim 14, including a passage extending axially forward in the turbine engine conducting the purge air exiting from the first purge air path to a location adjacent a turbine stage cooling cavity, where the purge air mixes with air from the turbine stage cooling cavity, and including a chamber conducting purge air axially rearward to an inlet to the second purge air path.

16. The turbine assembly of claim 15, wherein the first purge air path is supplied with purge air from a first supply location in a compressor section of the turbine engine, and the turbine stage cooling cavity is supplied with cooling air from a second supply location of the compressor section different from the first supply location.

17. The turbine assembly of claim 14, wherein a portion of the purge air exiting the second purge air path feeds purge air to a connecting purge air path extending radially inward through a fairing surrounding the at least one of the struts.

18. The turbine assembly of claim 17, wherein a portion of the purge air exiting the second purge air path feeds purge air in an axially forward direction to a location of a seal between a turbine ring segment and the outer flow path wall.

19. The turbine assembly of claim 14, wherein the strut orifices are defined through the side walls at locations radially outward from the outer flow path wall.

20. A turbine assembly in a turbine engine, the turbine assembly having an outer casing, an inner casing, an annular exhaust gas path defined between outer and inner flow path walls, and a turbine exhaust casing cavity located radially outward and radially inward from the gas path, and further comprising:

a plurality of struts extending between the inner casing and the outer casing;

a first purge air path extending radially inward through at least one of the struts conducting purge air to the inner casing for supplying purge air to at least one component radially inward from the inner casing;

a second purge air path having an inlet located at the inner casing and extending radially outward through the at least one of the struts for further conducting the purge cooling air radially outward to provide a flow of purge air to an outer location of the exhaust casing cavity radially outward from the outer flow path wall; and including a passage extending axially forward in the turbine engine conducting the purge air exiting from the first purge air path to a location adjacent a turbine stage cooling cavity, where the purge air mixes with air from the turbine stage cooling cavity, and including a chamber conducting purge air axially rearward to an inlet to the second purge air path.

* * * * *